United States Patent [19]

Kato

[11] Patent Number: 4,530,106
[45] Date of Patent: Jul. 16, 1985

[54] COUNTER DEVICE FOR USE IN TAPE RECORDER

[75] Inventor: Toshikazu Kato, Tokyo, Japan

[73] Assignee: Olympus Optical Company Limited, Tokyo, Japan

[21] Appl. No.: 482,619

[22] Filed: Apr. 6, 1983

Related U.S. Application Data

[63] Continuation of Ser. No. 226,157, Jan. 19, 1981, which is a continuation of Ser. No. 7,807, Jan. 30, 1979, abandoned.

[30] Foreign Application Priority Data

Feb. 1, 1978 [JP] Japan .................................. 53-11169

[51] Int. Cl.³ ........................ G06M 3/06; H03K 21/36
[52] U.S. Cl. ........................................ 377/18; 377/26; 377/45; 377/111; 360/137
[58] Field of Search ............................... 377/18, 17, 45; 360/137, 72.3, 74.2

[56] References Cited

U.S. PATENT DOCUMENTS

| | | | |
|---|---|---|---|
| 3,681,575 | 11/1972 | Wolfe | 377/18 |
| 4,065,720 | 4/1977 | Pogue | 377/45 |
| 4,167,787 | 1/1979 | Satoh et al. | 360/137 |
| 4,189,636 | 2/1980 | Satoh | 377/18 |
| 4,239,957 | 12/1980 | Satoh et al. | 377/45 |
| 4,250,402 | 2/1981 | Mizote et al. | 377/24 |
| 4,263,657 | 4/1981 | Oka et al. | 364/561 |
| 4,328,413 | 5/1982 | O'Neil et al. | 377/24 |

Primary Examiner—Stanley D. Miller
Assistant Examiner—K. Ohralik
Attorney, Agent, or Firm—Toren, McGeady, Stanger, Goldberg & Kiel

[57] ABSTRACT

In the disclosed device, a counter digitally counts the used or unused length of a tape, a display using a liquid crystal or the like displays the count, and a switch optionally shifts the count up or down.

5 Claims, 3 Drawing Figures

U.S. Patent    Jul. 16, 1985    4,530,106
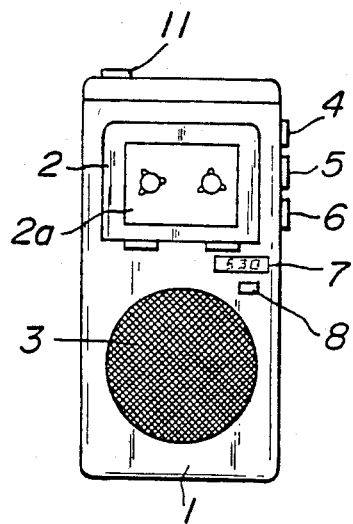
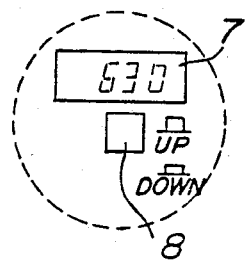
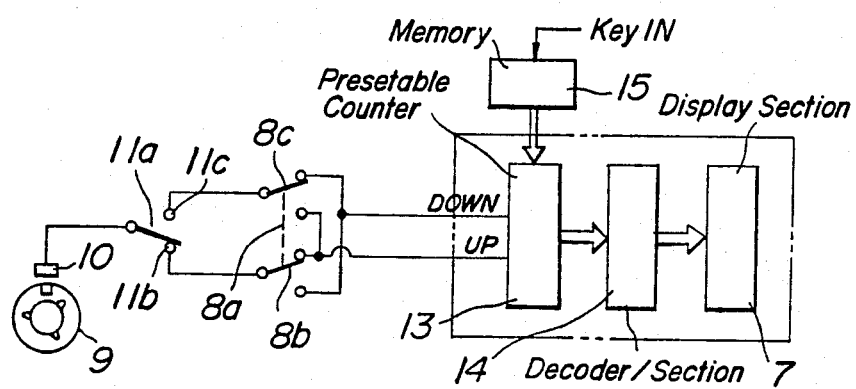

COUNTER DEVICE FOR USE IN TAPE RECORDER

This is a continuation of application, Ser. No. 226,157, filed Jan. 19, 1981 which is a continuation of application, Ser. No. 007,807, filed Jan. 30, 1979, now abandoned.

BACKGROUND OF THE INVENTION

The present invention relates to tape recorders, and particularly, tape recorders which indicate the amount of tape that has been used by displaying the output of a counter with a liquid crystal unit.

Present tape recorders often use counters which count up during recording or reproducing and count down during rewinding.

Such counters have a number of disadvantages. This is so because it is desirable that such systems be capable of counting to display the amount of unused tape remaining during a recording or rewinding process.

SUMMARY OF THE INVENTION

An object of the present invention is to satisfy the above requirement.

Another object of the present invention is to provide a counter device for use in a tape recorder displayed by LCD's which can select either one of the addition or reduction, if necessary, regardless of the running direction of a tape.

According to the present invention a counter device for use in a tape recorder comprises a counter means for digitally counting the used or non-used length of a tape, a display means for displaying the counted value of the counter, and a switch means for optionally selecting an addition counting or a reduction counting for the display of the counter.

The display means is of the liquid crystal type.

BRIEF DESCRIPTION OF THE DRAWING

FIG. 1 is a plan view showing one embodiment of a tape recorder according to the present invention;

FIG. 2 is an enlarged detail showing a counter display section of the tape recorder shown in FIG. 1; and FIG. 3 is a circuit diagram of the counter device for use in the tape recorder according to the present invention.

DESCRIPTION OF THE PREFERRED EMBODIMENT

In the drawings, the same reference characters designate the same or corresponding parts throughout the several views, FIG. 1 shows a counter containing a tape recorder according to the present invention. In FIG. 1, tape recorder 1 which uses a Microcassette (trade name), includes a front surface having a cassette mounting portion 2 and a speaker 3 and includes one side wall having mounted thereon a recording button 4, a reproducing button 5 and a stop button 6.

Below a cassette window 2a of the cassette mounting portion 2, and LCD tape counter display portion 7 is mounted above a counter display selecting push button 8.

The counter display selecting push button 8, as shown in FIG. 2, projects outward to count up, but can easily be depressed to count down, if necessary. If the button is depressed to count down, a memory signal from a memory can be applied to a present counter, which will be explained later on.

The relation between the display portion 7 and the selecting push button 8 appears in FIG. 3. Here, a pulse oscillator 10 for detecting one rotation of a take-up shaft or feed-out shaft 9 is connected to a switch 11a operated by a winding-back operation button 11.

A normally closed contact 11b of the switch 11a is used for recording, reproduction, quick feeding and cue actions, while a normally opened contact 11c closed only when the button 11 is pushed is used for winding back and review operations.

Each contact 11b, 11c of the switch 11a is connected to first and second movable contact members 8b, 8c of a double pole double-throw selector switch 8a.

The first and second movable contact members 8b, 8c are used for switching the counter up or down by contacting respective common terminals which are connected to a presettable counter 13.

A signal from the counter 13 is digitally displayed at the display section 7 through a decoder 14.

On the other hand, the presettable counter 13 also receives a signal from a memory 15.

When an MC-60 Microcassette is used for the memory 15, if 630 signals from a pulse oscillator 10 are generated until all of the tape is wound up, 630 counts are memorized, and at the time of key-in, i.e., the button 8 is pressed, 630 counting pulses are supplied to the counter 13.

In operation, using the thus constructed tape recorder at normal tape feed, i.e., in the PLAY mode, the counter 13 adds signals from the pulse oscillator 10 one by one, causing display of a counter number on the display section 7 and displays 630 as count number when a final end of the tape comes.

When the button 11 is pressed, the switch 11a is switched, the counter 13 starts counting down at every one pulse, so that the display on the display section 7 is gradually reduced to 0 in the completely wound-up position of the tape.

On the other hand, even if the tape is fed normally, for instance in the PLAY mode, if the display of the display portion 7 is increased and a residual amount of tape is to be observed, the button 8 is pressed, and then the switch 8a is switched to the count down in the PLAY mode and 630 memory signals from the memory 15 are supplied to the counter 13.

Therefore, 630 is displayed on the display section 7 and the display is successively reduced as the tape is fed. Accordingly, if the numeral on the display section 7 is observed at the time of recording, how much of the tape is left can immediately be understood.

Thus, regardless of the tapes running direction, the digital display is changed from counting up to down and vice versa, a preferred counting operation can be made with a simple and convenient construction.

In addition, the present invention is not limited to the above embodiment but numerals to be memorized by the memory can be set in accordance with a length of the tape and optionally set with a key, if necessary.

As described above, according to the present invention, the amount of tape feed can be displayed by counting up or down regardless of the tape's running direction by sample operation of the button, so that the counter device of the tape recorder according to the present invention is very convenient in use.

What is claimed is:

1. A counter device for use in a tape recorder, comprising a counter for digitally counting pulses representing movement of a tape, and display means for displaying the counted value of the counter, the improvement comprising switch means for optionally causing the counter to count up or down so the display of the counter can be optionally selected between an adding mode and a substracting mode irrespective of the travel direction of the tape.

2. A counter device as claimed in claim 1, wherein the display means is a liquid crystal type display device wherein said recorder includes a forward-reverse switch for causing forward and reverse movement of tape, and wherein said forward-reverse switch is connected serially with respect to said switch means so that said counter can count up or down for both the forward and reverse directions.

3. A counter device as in claim 1, further comprising memory means for holding a value entered so an operator may enter a value representing the length of a tape and for entering the value held into the counter.

4. A counter device as in claim 2, further comprising memory means for holding a value entered so an operator may enter a value representing the length of a tape and for entering the value held into the counter.

5. A counter device for a tape recorder, comprising:
a counter for counting pulses;
display means for displaying the count in the counter;
control means coupled to the tape recorder for representing movement of tape in either direction and applying the pulses to the counter so that the counter moves in the same direction regardless of the direction of movement of the tape; and
said control means including a sensor coupled to the tape recorder for producing pulses regardless of the direction of movement of the tape, and switch means for applying the pulses to the counter and setting the counter to count up or down, regardless of the movement of tape in either direction.

* * * * *